United States Patent Office 2,693,629
Patented Nov. 9, 1954

2,693,629

METHOD OF PRODUCING ELECTRIC CONDENSERS

Peter Denes, Budapest, Hungary

No Drawing. Application September 24, 1948,
Serial No. 51,121

1 Claim. (Cl. 29—25.42)

This invention relates to a method of producing electric condensers having dielectrics consisting predominantly or completely of metal oxides or metal oxide compounds, such as glassy, enamel and ceramic materials, by means of which high-capacity condenser units can be manufactured cheaply and in small dimensions according to the present invention.

It has been known that condensers having dielectrics consisting of glassy, enamel and ceramic materials, possess excellent electrical, mechanical and dielectrical properties. However, production of high-capacity units from these dielectrics is rather difficult, because, owing to their brittleness, these materials cannot be produced in the form of self-supporting bodies having a thickness of less than about 0.2–0.3 mm.

In my co-pending application Serial No. 764,001, filed on July 26, 1947 now Patent 2,556,257 issued June 12, 1951, and likewise my co-pending application filed on August 28, 1948 under Serial No. 46,719 now abandoned, I have disclosed processes for manufacturing electric condensers provided with very thin ceramic layers. According to the method of said patent application Serial No. 764,001, a ceramic material is applied to metal ribbons by electrophoresis, spraying or the like, in a thin layer, e. g. a layer of 25–50 microns thickness, the coated ribbons are assembled and wound up, and the rolled condenser is heated to sintering temperature in a protecting gas atmosphere. According to the method of the above mentioned second patent application Serial No. 46,719, an oxidizable thin metallic coating is applied to the metal armature of the condenser by electrolysis, spraying, cathodic dispersion or the like, in a thin layer of, for example, 10–25 microns and this coating is oxidized to form an oxide layer. The ribbons of the metal armatures being thus coated with a thin oxide layer, can be assembled, wound up and sintered.

Although these methods are suitable for the production of high-capacity ceramic condensers, they have the following disadvantages:

(a) The quality of the dielectric layer cannot be sufficiently controlled during manufacture and one single defective spot may affect the value of the whole condenser;

(b) The ceramic material cannot overlap in breadth or in length at least one of the metal armatures, and this fact makes the formation and insulation of the ends difficult;

(c) At least one armature must be a metal ribbon, although the exclusive use of powdered metal armatures would be cheaper and would permit the manufacture of smaller condensers.

All these disadvantages are eliminated by the present invention, according to which metal oxides or metal oxide compounds are mixed with certain organic materials which are capable of forming together with the metal oxides self-sustaining thin and elastic bodies, plates, foils or the like. These materials, which are used in a quantity less than the moiety, will be denoted herein as "film-forming materials." The thin insulating plates or films formed from the metal oxides and film-forming materials are provided on both sides by metal armatures and can be shaped to condensers in plain as well as in coiled form.

In carrying out my invention, as a film-forming material any organic material can be used which is capable of forming self-supporting substantially elastic films and retains this property and its elasticity even upon the incorporation therein of a considerable amount, e. g. more than 50% of filling materials. Such materials are the various cellulose derivatives, such as nitrocellulose, acetylcellulose, benzyl cellulose, etc., rubber, rubber-latex, neoprene-latex, butadiene-latex, isoprene-derivatives, and numerous polymerized materials, e. g.: polystyrol, polyvinyl chloride, polyvinyl carbazole, polymerized isoprene, polymerized acryl- and methylacryl resins, nylon, silicones, etc.

For increasing the elasticity of the film, plasticizing materials can be used, e. g. castor oil, glycerine, glycols, esters of polymerized ricinoleic acid, phthalic acid anhydride, esters of phthalic acid, triacetin, tricresyl phosphate, triphenyl phosphate, tributyl phosphate, etc.

The films are generally more elastic in wet state than in dried condition, and therefore it is expedient to mix the solution of the film-like materials with a small quantity of slowly evaporating solvents, e. g. higher alcohols, which evaporate only after the final manufacturing steps, such as winding up of the condenser. The same effect may be attained by moistening the film with water.

The moist film has also the advantage that the metal foil or metal powder layer deposited therein adheres or sticks well to the moist film and no separation of the metal armature and dielectrics takes place during winding.

In selecting the film-forming materials, it should be also taken into consideration that it should be possible to eliminate them later from the metal oxides by physical or chemical steps, e. g. heating, dissolution, precipitation, so that condensers having dielectrics consisting of pure metal oxides or metal oxide compounds are obtained according to my present invention.

Upon heating in free air, most organic film-forming and organic plasticizing materials volatilize in form of vapors, and only the metal oxides remain between the metal armatures, however, in a relatively loose structure. At the temperatures necessary for the removal of the organic film-forming and plasticizing materials no melting or sintering of the metal oxides takes place, but it is possible to eliminate this looseness caused by the removal of the film-forming materials, by compressing the loose metal oxides under pressure. Under the action of pressure, small crevices or cracks which may have been formed during winding, are also eliminated. Compression of the metal oxide layer by pressure can be applied, of course, also in cases in which the film-like materials have been removed by means other than heating.

In the case of disc-condensers, pressure can be applied to the plain surfaces, while in the case of roll condensers, pressure may be applied to the side walls. In these cases the following has to be taken into consideration.

If the armatures used consist of metal powder, they are affected by the compression in about the same proportion as the insulating layer, and the uncovered portions of the films left for the purpose of insulation at the edges shrink under the action of pressure also proportionally. If the armatures consist of metal ribbons, for example thin foils of about 1 micron thickness, they may rumple and show an undulating appearance under the action of pressure and the change in their breadth might be less than the decrease of breadth of the dielectric material. Therefore, in the case of foil-armatures relatively large free strips must be left at the borders. If thicker foils, e. g. over 5 microns, are used, it may happen that the crumpling foil pierces the insulating layer and causes short-circuiting. It is, therefore, expedient to compose the armatures of such thick foils of several parallel strips separated by interstices from each other and the strips may be brought nearer to each other by compression. Other metallic products, e. g. net-like structures, may also be used as armatures, and the same considerations apply to the construction of the projecting contact-ribbons of the metal powder layers.

Condensers prepared in the above described manner, in which the dielectrics consist of a mixture of the film-forming material and metal oxides, could be used in many cases without being subjected to further manufacturing steps. However, if it is intended to use metal oxides of high dielectric constant, the removal of the film materials is advisable, because in the use of dielectrics comprising different insulating materials having very substantially differing dielectric constants, the electrical strain on the insulating material of the lower dielectric factor is very large and this may easily cause breakdown of the condenser.

Condensers, in which the insulation consists of metal oxides only, may also be used after compression without further manufacturing steps. It is known, however, from the manufacture of ceramic and glass-capacitors that the most favorable electrical breakdown strength and the largest dielectric factor are attained, if the metal oxides are heated to a temperature at which they either melt together in the case of glassy and enamel materials or sinter together in the case of ceramic materials. Layers formed of the different groups of metal oxides are different in character, they show either melting or shrinking (sintering).

It is not always necessary to increase the temperature of heat treatment up to the melting or sintering temperature, as the electrical properties may be improved by heating to lower temperatures too, although not to the same extent as heating up to melting or sintering temperatures.

In selecting the metal of the condenser armature, the final temperature at which the heat treatment of the dielectrics is intended to be carried out should be taken into consideration. If no heat-treatment is contemplated, and the mixture of film-forming material and metal oxides is used as dielectrics, for economical reasons the armature may consist of aluminum foil, or any layer of pulverized metal, e. g. lead, aluminum, copper, etc. which is applied to the insulating film by processes known from the prior art, for example spraying, precipitations, cathodic dispersion, etc.

If the heat treatment requires the use of temperatures higher than 500° C., aluminum cannot be used, but a foil or layer of copper may be used in combination with most metal oxides of glass-like character. Oxidation of the copper can be prevented by applying a suitable protecting gas atmosphere.

In the case of dielectrics consisting of pure ceramic metal oxides and if the temperature of heat treatment is intended to be increased up to their sintering temperature, the armature of the condenser should be made of metals or alloys having a melting point higher than 1400° C., e. g. of foils of nickel, molybdenum, tantalum, or layers of powders of these metals. The application of a corresponding protecting gas atmosphere, for example a weakly oxidizing atmosphere containing 1% oxygen is also necessary in this case. The oxidizing atmosphere is necessary in order to check the decomposition of unstable oxides; but the amount of oxygen should be kept low in order to avoid substantial oxidation of the metal armatures. Condensers comprising armatures of nickel-chromium, Kanthal, etc. can be sintered on free air.

In selecting the metal oxides, and/or metal oxide compounds serving as dielectrics, various viewpoints may be followed. For example, high electrical breakdown strength, or high dielectric factor may be desirable, as each of these properties makes it possible to build condensers of small volume and big capacity. In the case of high-frequency condensers, other properties, such as small dielectric loss, small temperature coefficient, etc. may be required.

In order to obtain high electrical breakdown strength, e. g. the aluminum-, magnesium-, beryllium-, silicon-, oxides and the glasslike materials may be used. If on the other hand, high dielectric factor is required, titanium dioxide, zirconium dioxide, titanates of the earth metals and zirconates of the earth metals may be selected. The very numerous glassy and ceramic materials which are formed from mixtures and compounds of various metal oxides may also be used in carrying out the present invention.

The following examples illustrate some preferred embodiments of the present invention.

*Example 1.*—To a 10% solution of denitrated nitro cellulose in ethyl acetate, 3% by weight of a plasticizer consisting of a dibutyl phthalate and so much of colloidal calcium titanate are added that the proportion by weight of calcium titanate to the other components should be 7:1. From the solution a film of 50 microns thickness is produced according to known methods. The content of calcium titanate in the film is about 80 per cent by volume.

The film to be produced can be easily controlled by winding it up by means of simple automatic arrangements with regard to its thickness, homogeneity and electrical strength. For this purpose, the film is caused to pass through two revolving copper cylinders connected with the two poles of a current source of a tension which must be supported by the wet film. If the thickness is too small or for any other reason the film breaks down at any place, the faulty part can be removed automatically.

The film thus obtained is then supplied on both sides by nickel layers of 0.5 micron thickness, formed by cathodic dispersion continuously. Assembling five metallized films thus formed and placing at both ends tongues of nickel ribbon between the contacting equipotential nickel layers, the projecting parts of the nickel ribbons are welded together by means of nickel wires and then, the films are rolled up to a coil. The projecting parts of the two nickel wires are the outer contacts.

The rolled condenser is put into a dismountable steel ring, the inner diameter of which corresponds exactly to the outer diameter of the condenser coil and which is also provided with a mandrel having a diameter corresponding to that of the mandrel upon which the condenser coil has been rolled up. The ring is also provided with suitably shaped recesses for receiving the contact wires of the condenser. The ring and the condenser placed therein are heated up to about 400° C., and at this temperature the cellulose and dibutyl phthalate are driven out, leaving a layer of calcium titanate.

In the next step and ring housing the condenser is placed in a hydraulic press and the side-walls of the condenser coil are compressed by means of a moving piston and a fixed counterpiece fitting exactly between the diameters of the ring and the mandrel under a pressure of 200 atm. In this step the thickness of the coil is reduced by about 20% and the calcium titanate is compressed to a dense layer. The condenser coil is then removed from the dismountable ring, and is heated to 1300° C. in a furnace filled with argon gas. Heating to this temperature causes the calcium titanate to sinter completely, and also causes the nickel powder to bake completely together in itself as well as together with the nickel ribbon contacts to well-conducting uniform ribbons.

The capacitor produced in this way has a breakdown voltage of 1000 volts and the volume of a 5 $\mu$f. unit is only about 15 cm.$^3$ The total loss factor, including the ohmic loss of the metal armatures, is about 0.02.

*Example 2.*—To the solution of a film-forming material such as polymethyl-acrylate, aluminum oxide and a small quantity of glass-forming oxides, e. g. a mixture of lead oxide, silicon dioxide, sodium oxide and stibium oxide is added, in such proportion that the sum of the glass-forming oxides should amount to 10% of the aluminum oxide. The armatures consist of copper foils. After the removal of the polymethyl-acrylate and compression of the condenser in the manner described in Example 1, the condenser coil is heated to 850° C. to melt the enamel which binds the aluminium oxide particles. If the thickness of the dielectric layer is 50 microns, this condenser supports 3000 volts, but its capacity is essentially smaller than that of the condenser prepared according to Example 1.

*Example 3.*—In order to obtain a high-frequency condenser, 75% magnesium titanate is incorporated in plasticized polymerized ethylene dissolved in xylol, and the mixture obtained is formed to a film. From this film discs are punched and covered on both sides by copper layers. The contacts are soldered to the copper layers. The condenser is not subjected to a heat treatment. The resulting dielectric factor is not large, about 8–10, but the power factor is very small: about 0.0001 and the temperature coefficient is even smaller.

*Example 4.*—If high-frequency condensers of small dimensions are intended to be made in larger capacities, winding in two directions may be applied, in which case the opposite self-inductions destroy each other. As dielectric materials, magnesium titanate, zirconium titanate and the like can be used, having a low power factor, if desired with a small addition of enamel-forming materials, similar to those described in Example 2. The oxides can be incorporated, e. g. in a polystyrol film. The condenser can be used like those described in the previous examples, with or without a heat treatment.

*Example 5.*—It is possible to avoid the insertion of contact ribbons between the powdered layers, welding the ribbons, etc. by proceeding in the following manner. In this example only two films are used, one of them covered on both sides with a metal layer, and the other uncovered by metal. At both ends of the covered film, on a relatively long portion, only one of the sides is covered by a metal layer. The two films are assembled and wound up on a mandrel, to form a ring-shaped coil metallized on the inside and outside. The inner metal layer belongs to the one, the outer metal layer to the other armature. The condenser coil can now be treated as in the previous examples, and the contacts can be soldered easily to the inner and outer metal layers of the finished condenser.

Condensers with very large capacities for low working tensions may also be produced according to the present invention. Such condensers could not be produced for alternating current at reasonable costs prior to the present invention, with the exception of electrolytic condensers for direct current, formed at low tensions.

The methods according to the present invention permit the manufacture of condensers of very large capacities, e. g. many thousand microfarads for a working tension of 10–20 volts, by using materials of a very high dielectric factor, e. g. barium-strontium-titanate, having $k=5000$ at room temperature, in 5–10 microns thickness. The dimensions of such condensers are many times smaller than those of an electrolytic condenser for the same requirements, while the production costs are not higher.

The term "metal oxide compounds" is used herein to denote compounds formed from mixtures of various metallic oxides, and as illustrative examples of which magnesium titanate, calcium titanate, and the compounds formed from the oxides used according to the above Example 2, may be mentioned.

It will be understood that the present invention is not limited to the specific steps, materials and other details described above, and may be carried out with various modifications without departing from the scope of the invention as defined in the appended claim.

What is claimed is:

A method of manufacturing electric condensers, which comprises forming a self-sustaining film containing at least one metal oxide and an organic film-forming material; providing at least one of the surfaces of said film with a metal electrode; removing the film-forming material; winding the material to form a condenser; subjecting the condenser to a pressing-operation and thereby converting the metal oxide into a solid layer and subjecting the condenser to a heat treatment in a weakly oxidizing atmosphere in order to improve the electrical properties of the said condenser.

References Cited in the file of this patent

UNITED STATES PATENTS

| Number | Name | Date |
|---|---|---|
| 2,449,952 | Pridham | Sept. 21, 1948 |

FOREIGN PATENTS

| Number | Country | Date |
|---|---|---|
| 587,935 | Great Britain | May 9, 1947 |
| 592,501 | Great Britain | Sept. 19, 1947 |
| 896,822 | France | May 8, 1944 |